United States Patent
Joshi et al.

[11] Patent Number: 5,803,013
[45] Date of Patent: Sep. 8, 1998

[54] INSTRUMENT CLUSTER GAUGE ASSEMBLY

[75] Inventors: Bhavesh Hariprasad Joshi, Canton; Janardan N. Shah, West Bloomfield, both of Mich.

[73] Assignee: Ford Motor Company, Dearborn, Mich.

[21] Appl. No.: 296,393

[22] Filed: Aug. 26, 1994

[51] Int. Cl.$^6$ ................................................. G01D 13/22
[52] U.S. Cl. .......................................... 116/328; 116/332
[58] Field of Search ...................... 324/154 PB; 116/288, 116/327, 328, 329, 330, 331, 332, DIG. 6, DIG. 23, DIG. 36, DIG. 45, 62.1, 62.2, 62.3, 62.4, 286, 287

[56] References Cited

U.S. PATENT DOCUMENTS

| 52,849 | 2/1866 | Hastings | 116/332 |
|---|---|---|---|
| 3,855,787 | 12/1974 | Assmus | 368/238 |
| 4,300,470 | 11/1981 | Furukawa | 116/332 |
| 4,755,053 | 7/1988 | Levinson et al. | 356/400 |
| 4,959,759 | 9/1990 | Kohler | 116/288 X |
| 5,080,035 | 1/1992 | MacManus | 116/328 |
| 5,143,016 | 9/1992 | Fournier | 116/332 |

FOREIGN PATENT DOCUMENTS

| 497664 | 8/1992 | European Pat. Off. | 116/286 |
|---|---|---|---|
| 2594540 | 9/1987 | France | 116/328 |

*Primary Examiner*—Diego F.F. Gutierrez
*Assistant Examiner*—Willie Morris Worth
*Attorney, Agent, or Firm*—Mark S. Sparschu

[57] ABSTRACT

An instrument cluster gauge includes a pointer assembly and a gauge movement. The gauge movement has a staff with a constant diameter. The pointer assembly includes a bushing intended to be placed over the staff when the pointer assembly is mounted on the gauge movement. The bushing has a bore having a lead-in portion providing radial clearance with the staff; a main contact portion with a slight interference with the staff; and a clearance portion providing radial clearance with the staff. The geometry just described facilitates the mounting of the pointer assembly on the gauge movement to a predetermined depth rather than to a predetermined force. Further, the assembly force is defined by design and is therefore more consistent than where a pointer assembly is mounted on a gauge movement staff to a target force. Also, the lead-in eases assembly of the pointer assembly onto the staff, facilitating flexible manufacturing. The bushing further has a face with a stippled surface. The stipple on the face of the bushing facilitates the use of machine vision in the mounting of the pointer assembly on the staff.

6 Claims, 3 Drawing Sheets

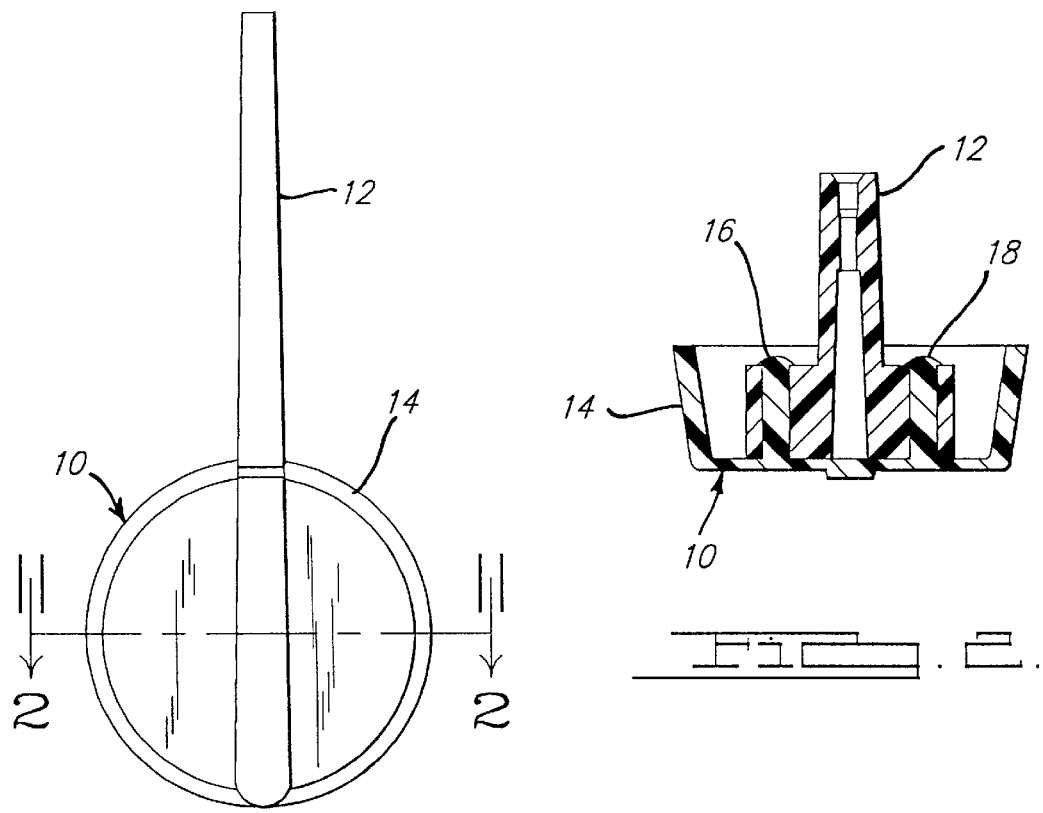

INSTRUMENT CLUSTER GAUGE ASSEMBLY

BACKGROUND OF THE INVENTION

1. Field of the Invention

The present invention relates to gauge assemblies for automotive instrument clusters.

2. Description of the Related Art

A typical automobile has an instrument cluster with a number of gauges. The gauges each typically comprise a gauge movement electrically connected to whichever sensor provides the data to be displayed by that gauge. The gauge movement has a staff on which is mounted a pointer assembly. The gauge movement rotates the pointer assembly, which displays the information of the gauge with reference to graduations marked on a face plate of the instrument cluster.

A difficult operation in the assembly of an automotive instrument cluster is mounting pointer assemblies on gauge movements. Some movements have tapered staffs, with corresponding split brass cylindrical bushings on the pointer assemblies. The pointer assembly is pressed onto the staff until a predetermined force is reached. Although such a method has long been used and has been generally successful, at least four problems can occur with such a method. First, if the equipment or person mounting the pointer assembly applies too much force, the gauge movement can be damaged. Second, if too little force is applied, the pointer assembly is likely to work loose over time and fall off the staff. Third, the use of a tapered staff assures that there is a portion of the staff with a small cross-section. That portion is subject to bending and breakage as the pointer assembly is mounted on the staff. Finally, force is not the ideal variable to control in mounting a pointer assembly on a staff. The most critical goal is to place the pointer assembly onto the gauge movement to a predetermined depth. To the extent that the staff and the bushing have tolerances which vary from nominal dimensions, controlling the assembly force (no matter how accurately) will assure that depth will vary from assembly to assembly.

A possible solution to some of the above problems is disclosed in U.S. Pat. No. 5,080,035, issued to MacManus. In that patent, a pointer assembly has a plastic bushing with a polygonal cross-section. When the pointer assembly is pressed onto the staff, the walls of the bushing's polygonal cross-section flex outward. Further, contact between the staff and the walls is limited to a predetermined length. The configuration just described limits the assembly force of the pointer assembly.

However, at least one potential problem can exist with the configuration of U.S. Pat. No. 5,080,035. The flexing of the walls of the bushing can cause stresses which can crack the walls.

Therefore, a pointer assembly and gauge movement staff which solves the problems detailed above will provide advantages over the prior art.

SUMMARY OF THE INVENTION

The present invention provides an instrument cluster gauge. The gauge comprises a pointer assembly having a bushing, and a gauge movement further comprising a cylindrical staff with a substantially constant diameter, the staff having an end adapted to receive the bushing for mounting of the pointer assembly on the staff. The bushing further comprises an end and a bore. The bore has a cylindrical main contact portion having a first diameter slightly smaller than said diameter of the staff, and a clearance portion having dimensions which provide radial clearance from the staff. The main contact portion is located closer to the end of the bushing than the clearance portion. The pointer assembly is mounted on the staff of the gauge movement with the end of the staff extending into the clearance portion of the bore.

The present invention solves the problems described above related to the prior art. Mounting the pointer assembly on the gauge movement to a target depth, as opposed to a target force, is facilitated. Second, situations of excessive and inadequate assembly force are minimized. Also, the use of a constant diameter staff eliminates the tapering of a prior art staff and the likelihood of bending or breaking the staff.

BRIEF DESCRIPTION OF THE DRAWINGS

FIG. 1 is a front view of a pointer assembly 10 according to the present invention.

FIG. 2 is a cross-sectional view of FIG. 1 taken along line 2—2.

FIG. 3 is a front view of pointer 12 of pointer assembly 10.

FIG. 6A is a force-displacement curve for the installation of pointer assembly 10 onto staff 36.

FIG. 6B is a force-displacement curve for the installation of a typical prior art pointer assembly onto a typical prior art staff.

DETAILED DESCRIPTION OF THE PREFERRED EMBODIMENT

Referring to FIGS. 1 and 2, a pointer assembly 10 according to one embodiment of the present invention is illustrated. Pointer assembly 10 comprises pointer 12 and hub 14. Pointer 12 and hub 14 are fastened together by means of projections 16 and 18 of hub 14, which are heat-staked to pointer 12. Hub 14 is made of opaque plastic material, preferably black acrylonitrile butadiene styrene terpolymer.

Figure 4:
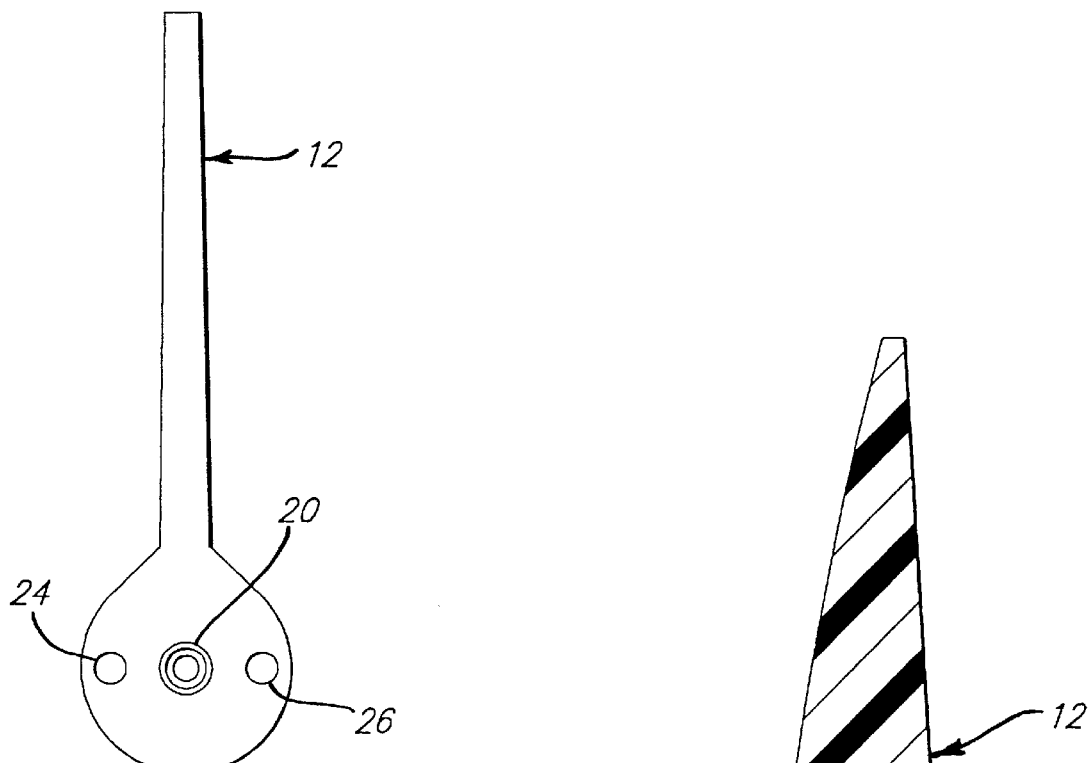
FIG. 4 is a rear view of pointer 12.
Figure 5:
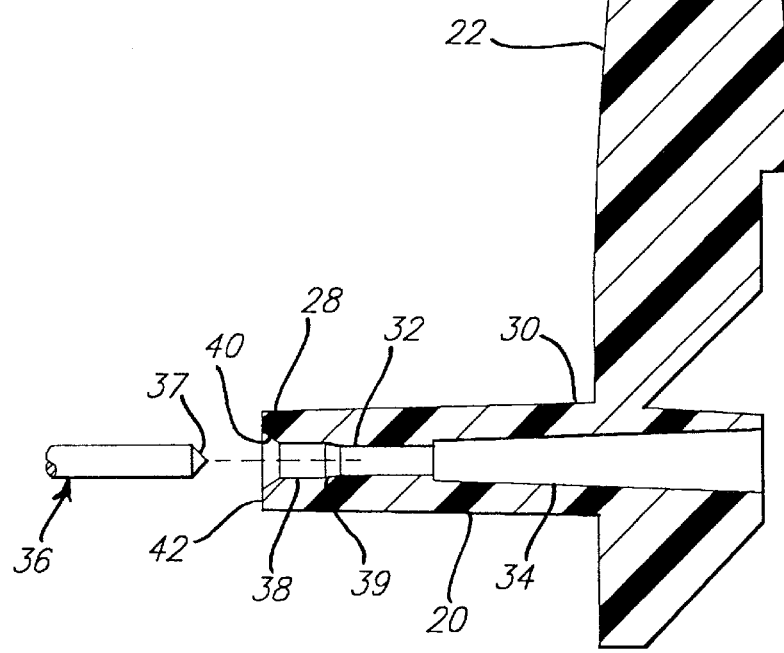
FIG. 5 is a side view of pointer 12, as well as a side view of staff 36 of a gauge movement according to the present invention.
Figure 5A:
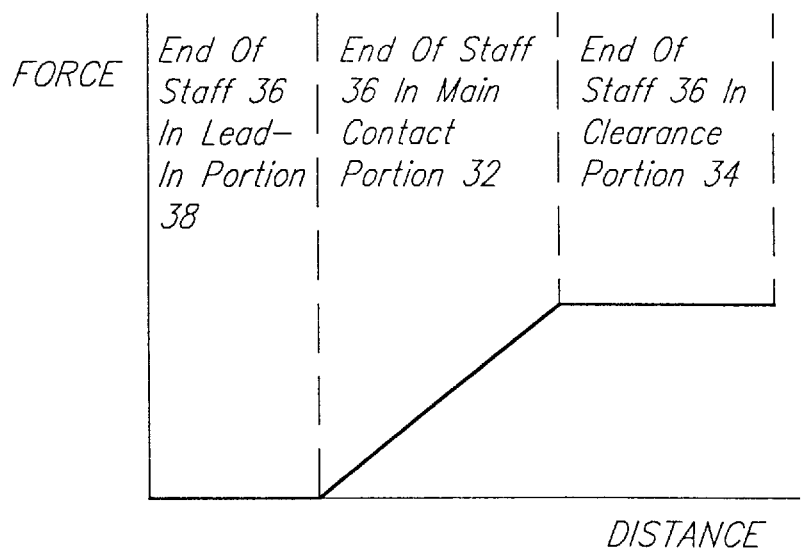
Figure 5B:
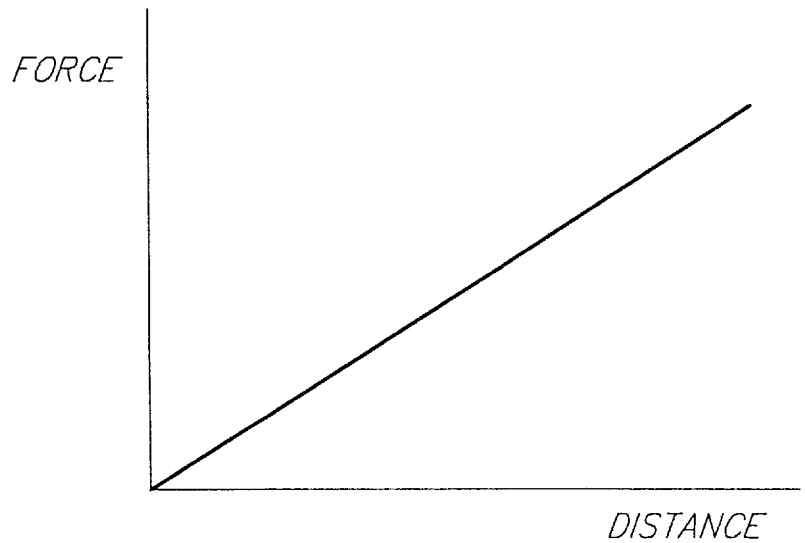

Referring now to FIGS. 3, 4 and 5, pointer 12 will be described. Pointer 12 comprises bushing 20 and pointer portion 22. Pointer 12 further comprises holes 24 and 26 through which projections 16 and 18 of hub 10 (FIG. 2) project.

Bushing 20 of pointer 12 will now be described in more detail. Bushing 20 has an end 28. Bushing 20 further has a bore. The bore is adapted to receive a staff 36 of a gauge movement. The gauge movement is intended to drive the pointer such that the pointer indicates the proper reading on gauge markings on the face of an automotive instrument cluster. The entirety of pointer 12, including bushing 20, is preferably made of polycarbonate plastic material, a material with high strength and heat resistance.

Staff 36 has a substantially constant diameter. This condition is in contrast to the staffs of most prior-art gauge movements, which are tapered. Staff 36 is made of stainless steel to inhibit corrosion of staff 36 and consequent potential cracking of bushing 20.

The bore of bushing 20 comprises a cylindrical main contact portion 32. Main contact portion 32 has a diameter slightly smaller than the diameter of staff 36. This condition provides a slight interference fit between main contact portion 32 and staff 36.

The bore of bushing 20 further comprises a clearance portion 34. Clearance portion 34 has dimensions which provide radial clearance from staff 36. As a result of the radial clearance, any portion of staff 36 which extends into clearance portion 34 will not contact the sides of the bore of bushing 20. That is, there will be clearance between staff 36 and clearance portion 34.

Unlike main contact portion 32, there is no requirement that clearance portion 34 have a round cross-section, although a round cross-section is preferred. It is merely necessary that there be clearance between staff 36 and clearance portion 34 when staff 36 extends into clearance portion 34.

The bore of bushing 20 further has a lead-in portion 38. Lead-in portion 38 has dimensions which provide radial clearance from staff 36. It is not necessary that lead-in portion have a round cross-section, although a round cross-section is preferred.

Between lead-in portion 38 and main contact portion 32 is transition portion 39, which transitions between lead-in portion 38 and main contact portion 32.

The bore of bushing 20 further has a bevelled portion 40.

Preferably, lead-in portion 38 is 2.0 millimeters long, transition portion 39 is 0.5 millimeters long and main contact portion 32 is 3.0 millimeters long. Further, staff 36 is preferably 1.0 millimeters in diameter.

Additionally, end 28 of bushing 20 has a face 42. Face 42 has a "stippled" texture, not being generally smooth as preferably is the remainder of bushing 20. Preferably, the stippled texture meets the industry specification for stipple #0 FQ (EDM i.d. #33).

Having described the construction of bushing 20, the functions of the various portions of bushing 20 will now be described.

When pointer assembly 10 (FIG. 1) is mounted on staff 36, end 37 of staff 36 passes bevelled portion 40 of bushing 20. End 37 of staff 36 then enters lead-in portion 38. By virtue of lead-in portion 38 being larger in diameter than staff 36, staff 36 very easily enters lead-in portion 38. A distinct advantage brought about by employing lead-in portion 38 is that assembly of pointer 12 onto staff 36 is very easy. No painstaking alignment of staff 36 and bushing 20 is necessary. Such easy assembly thus lends itself to flexible manufacturing systems, in that assembly by either human or machine is facilitated.

After passing transition 39 between lead-in portion 38 and main contact portion 32, end 37 of staff 36 enters main contact portion 32. Because main contact portion 32 is of smaller diameter than staff 36, force is required to cause end 37 of staff 36 to proceed into main contact portion 32. The farther that end 37 of staff 36 proceeds into main contact portion 32, the greater the force required. This is due to the area of contact between staff 36 and main contact portion 32 increasing as end 37 of staff 36 proceeds into main contact portion 32.

Once end 37 of staff 36 has passed through main contact portion 32 and entered clearance portion 34, however, the force required to move bushing 20 further over staff 36 becomes essentially constant. This is true because contact area between staff 36 and main contact portion 32 is now constant.

The consequent graph of force versus distance of travel of staff 36 is illustrated in FIG. 6A. It is seen that while end 37 of staff 36 is in lead-in portion 38, no force is required to move bushing 20 further over staff 36. While end 37 of staff 36 is in main contact portion 32, the required force increases generally linearly, as contact area between staff 36 and main contact portion 32 increases linearly. Finally, once end 37 of staff 36 is in clearance portion 34, the required force is essentially constant, in recognition of the constant surface area of contact between staff 36 and main contact portion 32.

FIG. 6A is in contrast to FIG. 6B, a force-displacement curve for a typical prior-art tapered staff and split metal pointer bushing. Because a typical prior art staff is tapered, the force increases continually as the bushing is pushed onto the staff.

The force-displacement curve of FIG. 6A is of considerable advantage in the assembly of an instrument cluster gauge, because of the constant-force portion once end 37 of staff 36 has entered clearance portion 34. The feature allows equipment to be used which places pointer assembly 10 onto staff 36 to a specified depth. Currently, in assembly of split-bushing pointer assemblies onto tapered staffs, equipment places the pointer assembly onto the staff until a specified assembly force is reached; based on dimensional tolerance of the staff and the pointer bushing, the depth of insertion will then vary. A well-controlled depth is needed to minimize leaks of backlighting from around hub 14 (FIG. 1) of pointer assembly 10 and parallax between the pointer and the graduations on the face of the gauge.

The present invention further allows the assembly force to be defined by the design of pointer assembly 10 and staff 36, rather than by the operation which assembles pointer assembly 10 and staff 36. Thus, excessive force (which could damage the gauge movement) and underforce (which could allow pointer assembly 10 to work loose over time and fall off of staff 36) are prevented.

The use of a straight staff 36 further allows the staff to be increased in diameter over prior art staffs. By definition, a tapered staff implies that the diameter of the staff narrows at one end. Instead, in the present invention, the constant-diameter staff requires no narrowing. As a result, inadvertent bending and breaking of the staff, a problem with tapered staffs, can be greatly reduced.

The stippled texture on face 42 of bushing 20 facilitates the use of automated equipment with "machine vision" to place pointer assembly 10 onto staff 36. The stippled texture can easily be located by the machine vision.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An instrument cluster gauge comprising:
a pointer assembly having a bushing;
a gauge movement further comprising a cylindrical staff with a substantially constant diameter, said staff having an end adapted to receive said bushing for mounting of said pointer assembly on said staff;
wherein said bushing further comprises an end and a bore; said bore having a cylindrical main contact portion having a first diameter slightly smaller than said diameter of said staff, and a clearance portion having dimensions which provide radial clearance from said staff, said main contact portion located closer to said end of said bushing than said clearance portion; said bore further having a lead-in portion between said main contact portion and said end of said bushing, said lead-in portion having dimensions which provide radial clearance from said staff; said bore further having a beveled portion at said end of said bushing;

wherein said bushing of said pointer assembly is mounted on said staff of said gauge movement with said end of said staff extending into said clearance portion of said bore.

2. An instrument cluster gauge as recited in claim 1, wherein said end of said bushing has a face surrounding said bore, said face having a stippled texture.

3. An instrument cluster gauge as recited in claim 1, wherein said bushing is made of plastic.

4. An instrument cluster gauge as recited in claim 3, wherein said staff is made of stainless steel.

5. An instrument cluster gauge as recited in claim 4, wherein:

said lead-in portion is approximately 2.0 millimeters long;

said main contact portion is approximately 3.0 millimeters long; and said staff is approximately 1.0 millimeter in diameter.

6. An instrument cluster gauge comprising:

a pointer assembly having a bushing;

a gauge movement further comprising a cylindrical staff with a substantially constant diameter, said staff having an end adapted to receive said bushing for mounting of said pointer assembly on said staff;

wherein said bushing further comprises an end and a bore; said bore having a cylindrical main contact portion having a first diameter slightly smaller than said diameter of said staff, and a clearance portion having dimensions which provide radial clearance from said staff; said main contact portion located closer to said end of said bushing than said clearance portion;

wherein said bushing of said pointer assembly is mounted on said staff of said gauge movement with said end of said staff extending into said clearance portion of said bore;

wherein said bore further comprises a lead-in portion between said main contact portion and said end of said bushing, said lead-in portion having dimensions which provide radial clearance from said staff; and wherein said bore further comprises a beveled portion at said end of said bushing.

* * * * *